United States Patent
Chowning

(10) Patent No.: US 8,970,158 B1
(45) Date of Patent: Mar. 3, 2015

(54) HIGH-EFFICIENCY-DIRECT-DRIVE CRYOCOOLER DRIVER

(75) Inventor: Louis David Chowning, Saint Cloud, FL (US)

(73) Assignee: FLIR Systems, Inc., Wilsonville, OR (US)

( * ) Notice: Subject to any disclaimer, the term of this patent is extended or adjusted under 35 U.S.C. 154(b) by 179 days.

(21) Appl. No.: 13/432,773

(22) Filed: Mar. 28, 2012

(51) Int. Cl.
*H02P 23/00* (2006.01)
*H02K 41/02* (2006.01)
*F25B 1/02* (2006.01)

(52) U.S. Cl.
USPC .......... 318/722; 318/135; 318/132; 318/293; 318/127; 318/129; 62/6; 62/215; 62/226; 62/228.1; 62/228.4

(58) Field of Classification Search
USPC ................ 318/722, 400.04, 800; 363/13
See application file for complete search history.

(56) References Cited

U.S. PATENT DOCUMENTS

| 5,032,772 | A * | 7/1991 | Gully et al. | 318/135 |
| 5,966,382 | A * | 10/1999 | Fawal et al. | 370/419 |
| 6,548,971 | B2 * | 4/2003 | Gokturk | 318/114 |
| 7,915,874 | B1 * | 3/2011 | Cuk | 323/224 |
| 8,076,920 | B1 * | 12/2011 | Melanson | 323/299 |
| 2003/0042877 | A1 * | 3/2003 | Tasi et al. | 323/207 |
| 2004/0108824 | A1 * | 6/2004 | Ueda et al. | 318/114 |
| 2005/0039454 | A1 * | 2/2005 | Shimizu et al. | 60/595 |
| 2005/0082994 | A1 * | 4/2005 | Qiu et al. | 318/128 |
| 2008/0310046 | A1 * | 12/2008 | Menegoli et al. | 360/75 |
| 2009/0153113 | A1 * | 6/2009 | Zilberberg | 323/282 |
| 2011/0031940 | A1 * | 2/2011 | Green | 323/205 |
| 2013/0181634 | A1 * | 7/2013 | Jmaev | 315/250 |

FOREIGN PATENT DOCUMENTS

EP 1079511 A1 * 2/2001
JP 08289582 A * 11/1996

OTHER PUBLICATIONS

Kirkconnell, C.S., Freeman, R.C., "Modular Linear-Drive Cryocooler ectronics," Cryocoolers 16, Internatinal Cryocooler Conference, Inc., Bouler, CO, (2011), pp. 667-674.*

* cited by examiner

*Primary Examiner* — Eduardo Colon Santana
*Assistant Examiner* — Said Bouziane
(74) *Attorney, Agent, or Firm* — Haynes and Boone, LLP

(57) ABSTRACT

In one embodiment, a cryocooler drive circuit for a cryocooler motor is provided that includes: a first switching power converter configured to track a first sinusoidal input voltage signal to provide a first sinusoidal output voltage signal at a first output node; and a second switching power converter configured to track a second sinusoidal input voltage signal to provide a second sinusoidal output voltage signal at a second output node, wherein the second sinusoidal input voltage signal is an inverted version of the first sinusoidal input voltage signal such that the cryocooler motor is driven by an alternating current flowing between the first and second output nodes.

20 Claims, 3 Drawing Sheets

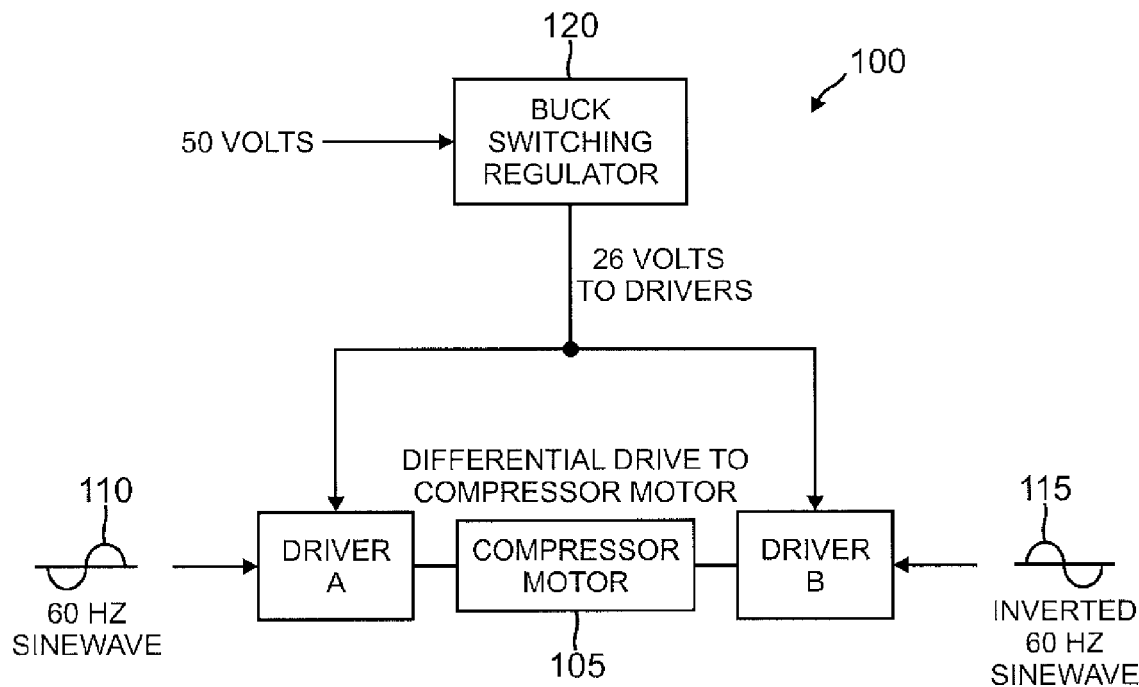
FIG. 1a --Conventional Art--
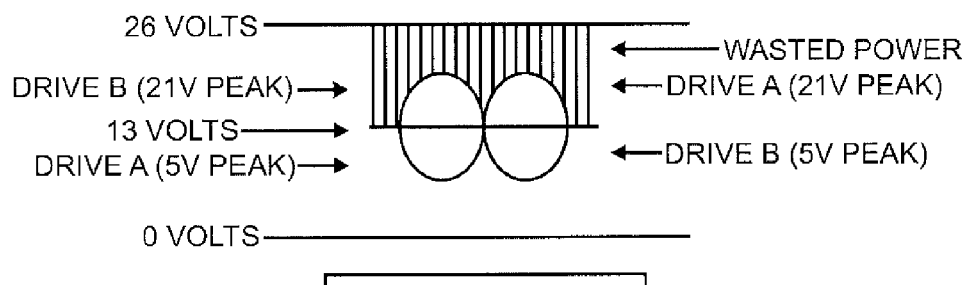
FIG. 1b --Conventional Art--

HIGH-EFFICIENCY-DIRECT-DRIVE CRYOCOOLER DRIVER

TECHNICAL FIELD

The present invention relates generally to cryocoolers, and more particularly to the use of switching power converters to drive a cryocooler motor.

BACKGROUND

Stirling cryocoolers include a motor for driving the compression and expansion cycles. For example, an integral Stirling cryocooler includes a single motor that cranks both a compression piston and a displacer piston held within a cold finger. As the motor spins faster, more heat is removed from a cold end of the cold finger to cool the load. Conversely, as the motor spins more slowly, less heat is removed. Thus, a cryocooler commonly includes a closed-loop feedback control system to control the motor speed and thus the cooling power of the cryocooler.

An alternating current (AC) motor requires a differential drive to provide the desired alternating current for powering the motor. FIG. 1a illustrates a conventional driver circuit 100 for powering a 60 Hz AC cryocooler motor 105. Driver circuits A and B each includes a pair of stacked transistors (not illustrated) so as to form an H-bridge with regard to motor 105. By appropriately cycling the H-bridge transistors on and off responsive to driving sine wave signals 110 and 115, an AC drive current and voltage is provided to motor 105. Sine wave signal 115 is 180 degrees out of phase to sine wave signal 110 so that driver A sources current while driver B sinks current and vice versa.

In driver circuit 100, a buck converter 120 converts a 50 V power supply to drive a 26 V power rail that supplies drivers A and B. But the peak sinusoidal voltage provided by either of driver circuits A and B is several volts lower than 26 V to properly bias the H-bridge transistors. In that regard, each of sinusoidal drive signals 110 and 115 cycles about a DC median voltage such as 13V as shown in FIG. 1b. The peak amplitude about this median voltage is 21 V to provide an extra 5 V between this maximum amplitude and the 26 V power rail to satisfy the appropriate voltage headroom for the switching transistors in driver circuits A and B. Since that peak voltage is 8 volts higher than the 13 V median voltage, the minimum voltage for the drive signals 110 and 115 is 13V−8 V=5V. The result of the extra voltage headroom is excess power that must be wasted as heat since it is not delivered to the motor. For example, if the power supply headroom is 5 V and the peak drive current is 8 amps, the wasted peak power equals 40 watts. Since energy must be conserved, this excess power is simply distributed as heat within driver circuits A and B. Thus, conventional cryocooler drive circuits have poor power efficiency.

Accordingly, there is a need in the art for improved cryocoolers with higher-efficiency cryocooler drive circuits.

SUMMARY

In one embodiment, a cryocooler drive circuit for a cryocooler motor is provided that includes: a first switching power converter configured to track a first sinusoidal input voltage signal to provide a first sinusoidal output voltage signal at a first node; and a second switching power converter configured to track a second sinusoidal input voltage signal to provide a second sinusoidal output voltage signal at a second node, wherein the cryocooler motor is driven by an alternating current flowing through the first and second nodes responsive to the first and second sinusoidal output voltage signals.

In another embodiment, a method of driving a cryocooler motor is provided that includes: generating a first sinusoidal input voltage signal and a second sinusoidal input voltage signal that is out-of-phase with regard to the first sinusoidal input voltage signal; in a first buck controller, converting a power supply voltage signal into a first sinusoidal output voltage signal that tracks the first sinusoidal input voltage signal, wherein the first sinusoidal output voltage signal is coupled to a first port for the cryocooler motor so as to drive an alternating current through the cryocooler motor; and in a second buck controller, converting the power supply voltage signal into a second sinusoidal output voltage signal that tracks the second sinusoidal input signal so as to drive the alternating current with regard to the second port.

In another embodiment, a cryocooler is provided that includes: a cryocooler motor; and a cryocooler drive circuit for driving an alternating current through the cryocooler motor, wherein the cryocooler drive circuit comprises a pair of buck controllers for generating the alternating current.

The invention will be more fully understood upon consideration of the following detailed description, taken together with the accompanying drawings.

BRIEF DESCRIPTION OF THE DRAWINGS

FIG. 1a is a block diagram of a conventional cryocooler drive circuit.

FIG. 1b illustrates the drive waveforms for the circuit of FIG. 1a.

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 2:
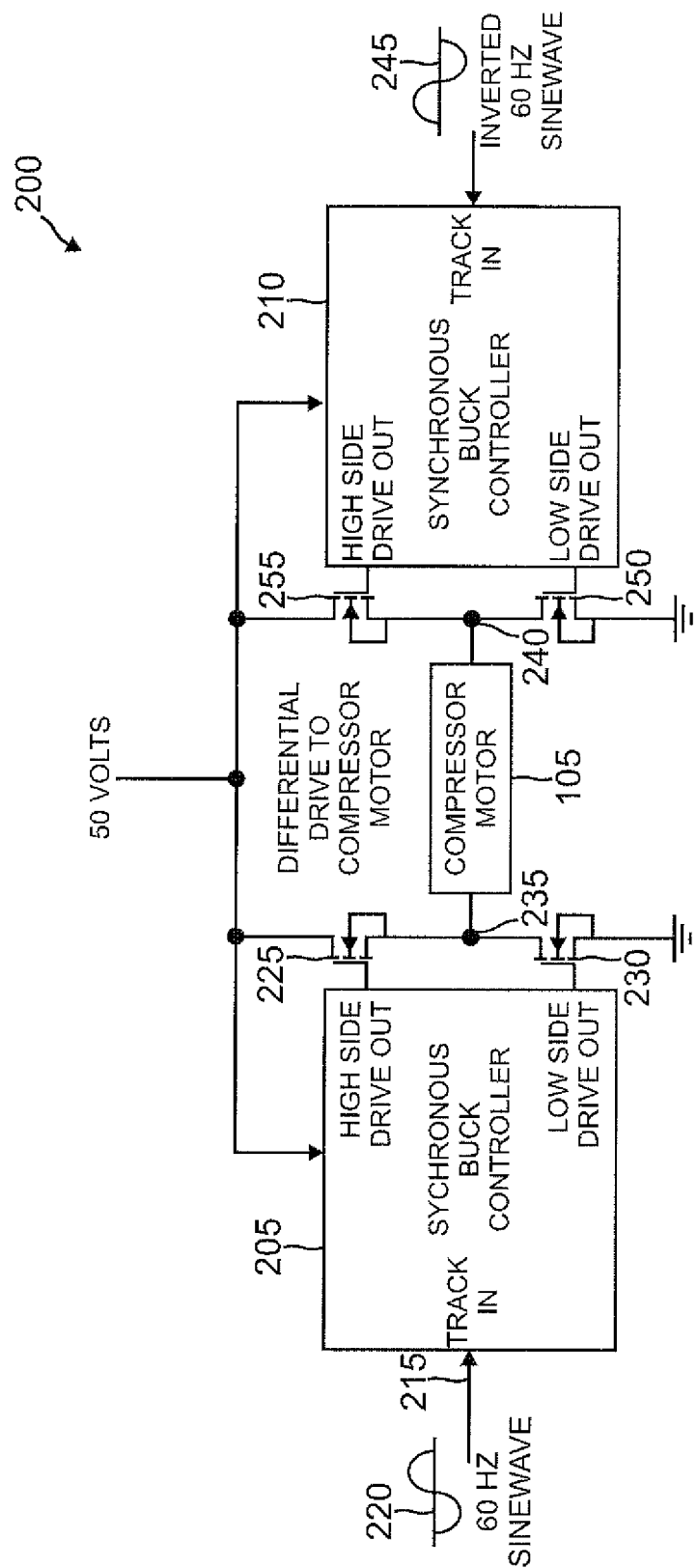
FIG. 2 is a block diagram for a high-efficiency cryocooler drive circuit using a pair of buck controllers in accordance with an embodiment of the disclosure.

To provide better efficiency and avoid the EMI problems associated with conventional cryocooler operation, a drive circuit is provided that includes a pair of switching power converters that generate an alternating current. A cryocooler motor couples between the switching power converters so as to be driven by the alternating current. An example drive circuit 200 is shown in FIG. 2. A first switching power converter such as a first buck controller 205 provides a compressor motor 105 a drive current in a differential or complementary fashion to the current provided by a second buck controller 210. Each buck controller is configured to provide an output voltage that tracks an input voltage. Thus, buck controller 205 receives a 60 Hz sinusoidal input voltage signal 220 at a tracking input port 215. In one embodiment, buck controller 205 is a synchronous buck controller controlling two switching transistors such as NMOS transistors 225 and 230. As known in the tracking buck controller arts, controller 205 is configured to pulse width modulate a complementary switching of transistors 225 and 230 such that a sinusoidal output voltage at an output node 235 tracks sinusoidal input voltage signal 220. In addition, those of ordinary skill will appreciate that the output inductor and capacitor for forming the buck controller LC filter for each of buck controllers 205 and 210 are provided but not shown for illustration clarity.

Output node 235 couples between a drain of NMOS transistor 230 and a source for NMOS transistor 225. A 50 V power supply rail couples to a drain for NMOS transistor 225. Buck controller 205 thus controls the complementary switching of transistors 225 and 230 such that the 50 V supply voltage is reduced to track input voltage signal 220 and produce a tracked output voltage at output node 235 accordingly. Therefore, tracked output voltage 235 is a 60 Hz sinusoidal signal with a precisely scaled up amplitude and median value of input voltage 220.

Opposing buck controller 210 drives an output voltage at output node 240 so as to be 180 degrees out of phase with the output voltage at node 235. Thus, buck controller 210 receives a sinusoidal input voltage 245 as a tracking input that is 180 degrees out of phase with sinusoidal input voltage 220. In this fashion, during one half of each sinusoidal input voltage cycle, output node 235 is sourcing current while output node 240 is sinking current. Similarly, output node 235 sinks current while output node 240 is sourcing current during the remaining half of each sinusoidal input voltage cycle. Like buck controller 205, buck controller 210 is also a synchronous buck controller in some embodiments so that it controls two NMOS transistors 250 and 255 in a complementary fashion to keep the output voltage at output node 240 tracking sinusoidal input voltage 245. A 60 Hz alternating current will then drive motor 105. It will be appreciated, however, that input voltages 220 and 245 need not be 60 Hz signals but could oscillate at other suitable frequencies such as 50 Hz such that motor 105 is driven by a 50 Hz drive current.

Note the advantages of drive circuit 200: unlike the conventional drive circuit 100 discussed with regard to FIG. 1, drive circuit 200 needs no H-bridge driver circuits but instead uses a pair of buck controllers. Thus, the voltage headroom needed to properly bias the H-bridge transistors in the driver circuits is avoided, thereby eliminating the substantial heat loss (e.g., 40 W) that would otherwise occur. In contrast, synchronous buck controllers such as controllers 205 and 210 have efficiencies of 80 to the high 90% range.

Figure 3:
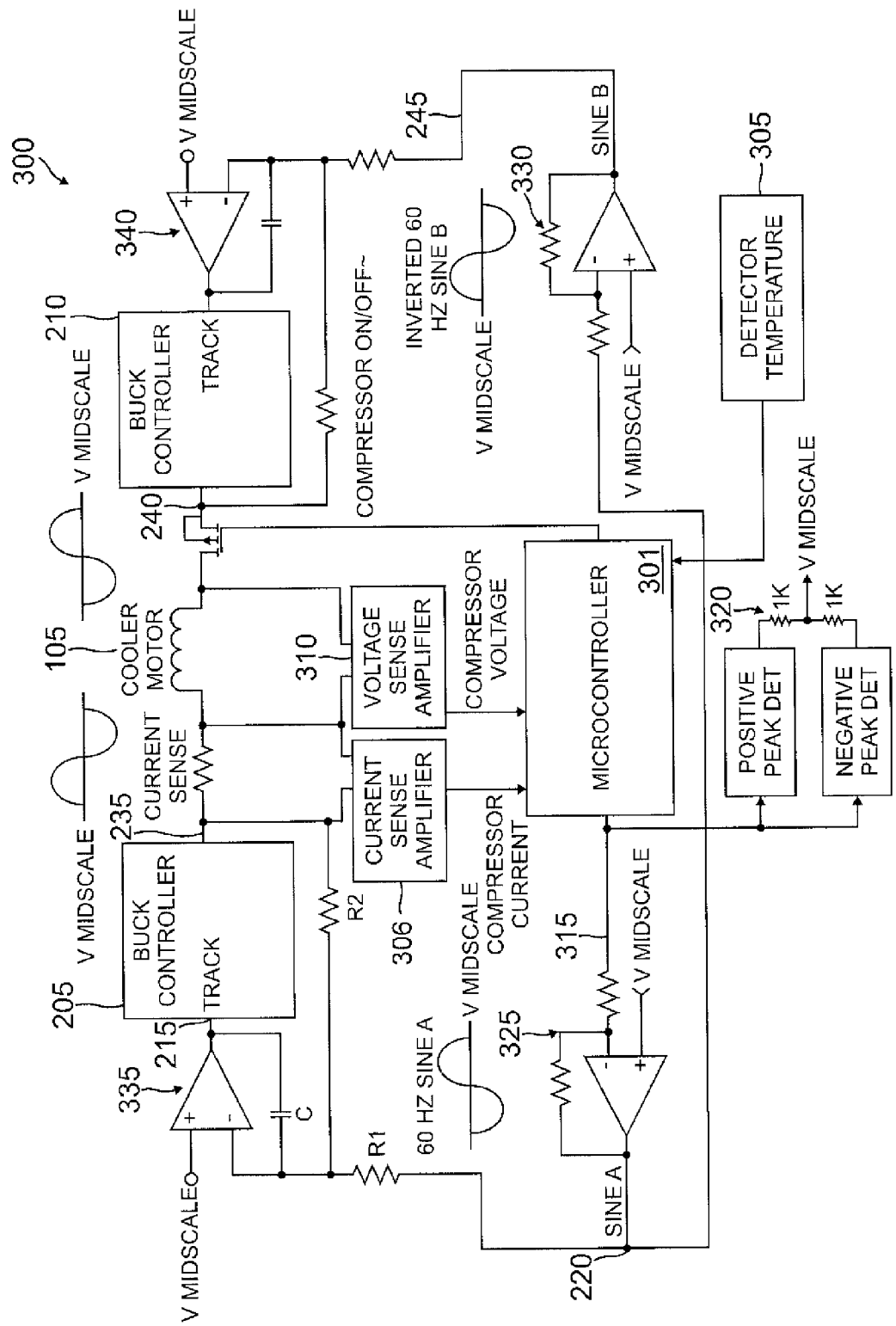
FIG. 3 is a block diagram of a cryocooler including a pair of buck controllers for generating the motor drive current in accordance with an embodiment of the disclosure.

As shown in FIG. 3 for a cryocooler 300, a feedback controller such as a microcontroller 301 responds to a temperature feedback signal from a temperature detector 305 at the cold end of the cryocooler finger (not illustrated) to control the amplitude of the sinusoidal current driven into motor 105 (and also to control the amplitude of the voltage driven across motor 105). To properly control the driving current and voltage relative to the sensed temperature, microcontroller 301 senses the current using a current sense amplifier 305 and senses the voltage using a current sense amplifier 306 and senses the voltage using a voltage sense amplifier 310. The switching transistors 225, 235, 250, and 255 as well as the power supply rail discussed with regard to FIG. 2 are not shown in FIG. 3 for illustration clarity.

Microcontroller 301 uses an internal digital-to-analog converter to produce an sinusoidal amplitude command signal 315. To produce more drive current in response to the sensed temperature being too high, microcontroller 301 increases the amplitude of sinusoidal amplitude command signal 315. Conversely, if the sensed temperature is too cold, microcontroller 301 reduces the amplitude of sinusoidal amplitude command signal 315. To provide a balanced differential drive current for motor 105, the midscale voltage of command signal 315 (the median between the maximum and minimum amplitudes) is sensed using a voltage sensing circuit 320.

The midscale voltage and sinusoidal amplitude command signal 315 are compared in a first unity-gain inverting operational amplifier 325 to produce sinusoidal input voltage signal 220 (sine A). Thus sine A goes equally positive and negative with regard to the midscale voltage. Sine A is then compared to the midscale voltage in a second unity-gain inverting operational amplifier 330 to produce sinusoidal input voltage signal 245 (sine B). Sine B is thus 180 degrees out of phase with regard to sine A. To minimize error in the buck controller tracking, sine signals A and B may be processed through integrating operational amplifiers. For example, a first integrator operational amplifier 335 integrates both sine A and the output voltage with reference to the midscale voltage such that the tracking input signal at tracking input 215 equals the midscale voltage—$((1/R1C)\int \text{sine A } dt) - (1/R2C)\int \text{Vo } dt)$, where Vo is the output voltage at output node 235. Similarly, a second integrator operational amplifier 340 integrates sine B and the output voltage at output node 240 with reference to the midscale voltage. The feedback through the integrators assists the buck controllers to minimize the tracking error. It will be appreciated, however, that other embodiments need not include integrators 335 and 340. For example, these integrators could be replaced with high-gain inverting operational amplifiers.

It will be appreciated that the techniques and concepts discussed herein are not limited to the specific disclosed embodiments. The appended claims encompass all such changes and modifications as fall within the true spirit and scope of this invention.

I claim:

1. A cryocooler drive circuit for a cryocooler motor, comprising:
   a first switching power converter configured to track a first sinusoidal input voltage signal to provide a first sinusoidal output voltage signal at a first node;
   a second switching power converter configured to track a second sinusoidal input voltage signal to provide a second sinusoidal output voltage signal at a second node, wherein the second sinusoidal input voltage signal is an inverted version of the first sinusoidal input voltage signal such that the cryocooler motor is driven by an alternating current flowing through the first and second nodes; and
   a first integrating operational amplifier for generating a first tracking signal responsive to the first sinusoidal input voltage signal and also responsive to the first sinusoidal output voltage signal, wherein the first switching power converter tracks responsive to the first tracking signal.

2. The cryocooler drive circuit of claim 1, further comprising a power supply rail providing a power supply voltage signal, wherein each of the switching power converters is configured to convert the power supply voltage signal into the first and second sinusoidal output voltage signals.

3. The cryocooler drive circuit of claim 1, wherein each of the first and second switching power converters is comprises a synchronous buck controller.

4. The cryocooler drive circuit of claim 1, further comprising a feedback controller configured to adjust an amplitude of the first and second sinusoidal input voltage signals in response to a cryogenic temperature generated in response to the alternating current driven into the cryocooler motor.

5. The cryocooler drive circuit of claim 4, wherein the feedback controller is a microcontroller.

6. The cryocooler drive circuit of claim 1, further comprising a first inverting operational amplifier for generating the first sinusoidal input voltage signal in response to a microcontroller sinusoidal amplitude command signal, wherein a microcontroller adjusts the amplitude of the first sinusoidal input voltage signal using the microcontroller sinusoidal amplitude command signal.

7. The cryocooler drive circuit of claim 6, further comprising a midscale voltage detection circuit configured to detect a midscale voltage in the microcontroller sinusoidal amplitude command signal, wherein the first inverting operational amplifier is also responsive to the midscale voltage in generating the first sinusoidal input voltage signal.

8. The cryocooler drive circuit of claim 6, further comprising a second inverting operational amplifier for generating the second sinusoidal input voltage signal in response to the first sinusoidal input voltage signal.

9. The cryocooler drive circuit of claim 8, wherein the second inverting operational amplifier is also responsive to a midscale voltage in generating the second sinusoidal input voltage signal.

10. The cryocooler drive circuit of claim 1, further comprising the cryocooler motor.

11. The cryocooler drive circuit of claim 1, further comprising a second integrating operational amplifier for generating a second tracking signal responsive to the second sinusoidal input voltage signal and also responsive to the second sinusoidal output voltage signal, wherein the second switching power converter tracks responsive to the second tracking signal.

12. A method of driving a cryocooler motor, comprising:
   generating a first sinusoidal input voltage signal and a second sinusoidal input voltage signal that is out-of-phase with regard to the first sinusoidal input voltage signal;
   in a first buck controller, converting a power supply voltage signal into a first sinusoidal output voltage signal that tracks the first sinusoidal input voltage signal, wherein the first sinusoidal output voltage signal is coupled to a first port for the cryocooler motor so as to drive an alternating current through the cryocooler motor; and
   in a second buck controller, converting the power supply voltage signal into a second sinusoidal output voltage signal that tracks the second sinusoidal input voltage signal so as to drive the alternating current with regard to second port;
   wherein the generating the first sinusoidal input voltage signal comprises generating a first tracking signal responsive to the first sinusoidal input voltage signal and also responsive to the first sinusoidal output voltage signal, wherein the first buck controller tracks responsive to the first tracking signal.

13. The method of claim 12, wherein the generation of the first and second sinusoidal input voltage signals occurs responsive to sensing a cryogenic temperature in a cryocooler driven by the cryocooler motor.

14. The method of claim 13, wherein the generation of the first and second sinusoidal input voltage signals further occurs responsive to a midscale voltage such that positive and negative cycles of the first and second sinusoidal input voltage signals are centered about the midscale voltage.

15. The method of claim 14, wherein the second sinusoidal input voltage signal is 180 degrees out-of-phase with the first sinusoidal input voltage signal.

16. A cryocooler, comprising:
   a cryocooler motor; and
   a cryocooler drive circuit for driving an alternating current through the cryocooler motor, wherein:
      the cryocooler drive circuit comprises a pair of buck controllers for generating the alternating current and a corresponding pair of operational amplifiers;
      the corresponding pair of operational amplifiers are configured to generate first and second tracking signals responsive to first and second sinusoidal input voltage signals for respective ones of the pair of buck controllers and also responsive to first and second sinusoidal output voltage signals configured to provide the alternating current; and
      the pair of buck controllers are configured to track responsive to the corresponding tracking signals.

17. The cryocooler of claim 16, wherein each of the buck controllers is a synchronous buck controller.

18. The cryocooler of claim 16, further comprising a feedback controller configured to adjust an amplitude of a sinusoidal amplitude command signal to adjust an amplitude of the alternating current generated by the pair of buck controllers.

19. The cryocooler of claim 18, further comprising a temperature detector for detecting a cryogenic temperature produced by the cryocooler, wherein the feedback controller adjusts the amplitude responsive to the detected cryogenic temperature.

20. The cryocooler of claim 19, wherein the feedback controller is a microcontroller.

* * * * *